(12) United States Patent
Schneider

(10) Patent No.: US 9,965,022 B2
(45) Date of Patent: May 8, 2018

(54) ACCELEROMETER BASED HALL EFFECT SENSOR FILTERING FOR COMPUTING DEVICES

(71) Applicant: GOOGLE INC., Mountain View, CA (US)

(72) Inventor: David Ness Schneider, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 289 days.

(21) Appl. No.: 14/792,202

(22) Filed: Jul. 6, 2015

(65) Prior Publication Data

US 2017/0010657 A1    Jan. 12, 2017

(51) Int. Cl.
```
G01C 9/00      (2006.01)
G06F 1/32      (2006.01)
G06F 1/16      (2006.01)
G01B 5/24      (2006.01)
G01D 5/14      (2006.01)
```
(52) U.S. Cl.
CPC ............ G06F 1/3287 (2013.01); G01B 5/24 (2013.01); G01D 5/142 (2013.01); G06F 1/1677 (2013.01); G06F 1/3231 (2013.01)

(58) Field of Classification Search
CPC ........ G01B 5/24; G01D 5/142; G06F 1/1677; G06F 1/3231; G06F 1/3287
USPC .................. 702/115; 713/323; 345/668, 184; 455/418
See application file for complete search history.

(56) References Cited

U.S. PATENT DOCUMENTS

| | | | |
|---|---|---|---|
| 8,903,517 B2 | 12/2014 | Perek et al. | |
| 9,612,625 B2 * | 4/2017 | Oliver | G06F 1/1677 |

(Continued)

FOREIGN PATENT DOCUMENTS

| | | |
|---|---|---|
| WO | 2012/036891 A2 | 3/2012 |
| WO | 2015/096084 A1 | 7/2015 |
| WO | 2017/007641 A1 | 1/2017 |

OTHER PUBLICATIONS

Pepka, Gary, "Position and Level Sensing Using Hall-Effect Sensing Technology", available online at <http://www.allegromicro.com/en/Design-Center/Technical-Documents/Hall-Effect-Sensor-IC-Publications/Position-and-Level-Sensing-Using-Hall-Effect-Sensing-Technology.aspx>, retrived on May 12, 2015, 8 Pages.

(Continued)

*Primary Examiner* — Mohammed Shamsuzzaman
(74) *Attorney, Agent, or Firm* — Brake Hughes Bellermann LLP

(57) ABSTRACT

In one general aspect, a method can include receiving, from a magnetic sensor included in a housing of a computing device, an indication of a change of state of the magnetic sensor, obtaining, subsequent to receiving the indication of the change of state of the magnetic sensor, first data from a first accelerometer included in a lid portion of the computing device, obtaining, subsequent to receiving the indication of the change of state of the magnetic sensor, second data from a second accelerometer included in a base portion of the computing device. The base portion and the lid portion can be connected by a hinge about which the lid portion is configured to rotate relative to the base portion between an open state and a closed state. The method can include determining whether the computing device is being closed based on analyzing the first data and the second data.

18 Claims, 7 Drawing Sheets

(56) References Cited

U.S. PATENT DOCUMENTS

| | | | |
|---|---|---|---|
| 2009/0052123 A1* | 2/2009 | Takeya | G01D 5/145 361/679.27 |
| 2009/0144574 A1* | 6/2009 | Tseng | G06F 1/1616 713/323 |
| 2010/0210216 A1 | 8/2010 | Westlund | |
| 2012/0127134 A1 | 5/2012 | Lai | |
| 2013/0076597 A1 | 3/2013 | Becze | |
| 2013/0232353 A1 | 9/2013 | Belesiu et al. | |
| 2014/0281444 A1 | 9/2014 | Waltermann et al. | |
| 2015/0031347 A1* | 1/2015 | Kim | H04M 1/0245 455/418 |
| 2015/0036047 A1* | 2/2015 | Bledsoe | H04N 5/2254 348/375 |
| 2015/0091882 A1* | 4/2015 | Dwarka | G06F 1/1626 345/184 |
| 2015/0278529 A1* | 10/2015 | Cho | G06F 1/1677 345/668 |
| 2016/0259378 A1* | 9/2016 | Oliver | G09G 5/38 |

OTHER PUBLICATIONS

International Search Report and Written Opinion received for PCT Patent Application No. PCT/US2016/039869, dated Sep. 29, 2016, 14 pages.

* cited by examiner

ACCELEROMETER BASED HALL EFFECT SENSOR FILTERING FOR COMPUTING DEVICES

TECHNICAL FIELD

This description generally relates to computing devices. The description, in particular, relates to the use of accelerometers and magnetic sensors in a computing device.

BACKGROUND

A computing device can include a lid coupled to a base with one or more hinges. The lid can rotate with respect to the base allowing the lid to be placed in multiple positions with respect to the base. Each of the multiple positions can result in a specific use of the computing device. For example, the lid can include a display device (which can be a touchscreen) and the base can include one or more input devices (e.g., a keyboard, a mouse, a trackpad, a touchpad, a pointing stick, one or more mouse buttons, a trackball, etc.). The lid can be rotated such that the lid contacts the base with the display device contacting the one or more input devices, placing the computing device in a closed position.

The computing device can include one or more magnetic sensors (e.g., Hall effect sensors) in the base and one or more magnets in the lid. A magnetic sensor can detect when the computing device is closed. Based on the computer device being closed, the computing device can enter a low power state such as a hibernate or a sleep state.

SUMMARY

In one general aspect, a method can include receiving, from a magnetic sensor included in a housing of a computing device, an indication of a change of state of the magnetic sensor, obtaining, subsequent to receiving the indication of the change of state of the magnetic sensor, first data from a first accelerometer included in a lid portion of the computing device, obtaining, subsequent to receiving the indication of the change of state of the magnetic sensor, second data from a second accelerometer included in a base portion of the computing device. The base portion and the lid portion can be connected by a hinge about which the lid portion is configured to rotate relative to the base portion between an open state and a closed state. The method can include determining whether the computing device is being closed based on analyzing the first data and the second data.

Example implementations may include one or more of the following features. For instance, the magnetic sensor can be a Hall effect sensor. The method can further include transitioning the computing device from a first power state to a second, lower power state based on determining that the computing device is being closed. The second power state can be one of a sleep mode and a hibernate mode. Analyzing the first data and the second data can include determining that the lid portion of the computing device is not being rotated relative to the base portion of the computing device from the open state to the closed state. The method can further include determining that the computing device is not being closed based on determining that the lid portion of the computing device is not being rotated relative to the base portion of the computing device from the open state to the closed state. Analyzing the first data and the second data can include obtaining, by the computing device, a lid accelerometer vector for the lid accelerometer, obtaining, by the computing device, a base accelerometer vector for the base accelerometer, and calculating a value for an orientation angle of the lid portion relative to the base portion based on the lid accelerometer vector and the base accelerometer vector. The method can further include determining that the computing device is being closed based on determining that the value of the orientation angle is equal to or less than a threshold value for the orientation angle. The method can further include determining that the computing device is not being closed based on determining that the value of the orientation angle is greater than a threshold value for the orientation angle.

In another general aspect, a non-transitory, machine-readable medium has instructions stored thereon. The instructions, when executed by a processor, can cause a computing device to receive, from a magnetic sensor included in a housing of a computing device, an indication of a change of state of the magnetic sensor, obtain, subsequent to receiving the indication of the change of state of the magnetic sensor, first data from a first accelerometer included in a lid portion of the computing device, obtain, subsequent to receiving the indication of the change of state of the magnetic sensor, second data from a second accelerometer included in a base portion of the computing device, the base portion and the lid portion being connected by a hinge about which the lid portion is configured to rotate relative to the base portion between an open state and a closed state, and determine whether the computing device is being closed based on analyzing the first data and the second data.

Example implementations may include one or more of the following features. For instance, the magnetic sensor can be a Hall effect sensor. The instructions, when executed by the processor, can cause the computing device to transition the computing device from a first power state to a second, lower power state based on determining that the computing device is being closed. The second power state can be one of a sleep mode and a hibernate mode. Analyzing the first data and the second data can include determining that the lid portion of the computing device is not being rotated relative to the base portion of the computing device from the open state to the closed state. The instructions, when executed by the processor, can further cause the computing device to determining that the computing device is not being closed based on determining that the lid portion of the computing device is not being rotated relative to the base portion of the computing device from the open state to the closed state. Analyzing the first data and the second data can include obtaining, by the computing device, a lid accelerometer vector for the lid accelerometer, obtaining, by the computing device, a base accelerometer vector for the base accelerometer, and calculating a value for an orientation angle of the lid portion relative to the base portion based on the lid accelerometer vector and the base accelerometer vector. The instructions, when executed by the processor, can cause the computing device to determine that the computing device is being closed based on determining that the value of the orientation angle is equal to or less than a threshold value for the orientation angle. The instructions, when executed by the processor, can cause the computing device to determine that the computing device is not being closed based on determining that the value of the orientation angle is greater than a threshold value for the orientation angle.

In yet another general aspect, a computing device can include a lid portion, a base portion, a magnetic sensor, a lid accelerometer configured to measure acceleration and orientation associated with the lid portion of the computing device, a base accelerometer configured to measure acceleration and orientation associated with the base portion of the computing device, and a controller. The controller can be configured to determine that the magnetic sensor has changed state. Subsequent to determining that the magnetic sensor has changed state, the controller can be configured to calculate a value for an orientation angle based on data received from the lid accelerometer and the base accelerometer, determine whether the value of the orientation angle is equal to or less than a threshold value for the orientation angle, and transition the computing device from a first power state to a second power state based on determining that the value of the orientation angle is equal to or less than the threshold value for the orientation angle.

Example implementations may include one or more of the following features. For instance, the first power state can be a full power state. The second power state can be one of a sleep mode and a hibernate mode. The controller can be further configured to not transition the computing device from a first power state to a second power state based on determining that the value of the orientation angle is greater than the threshold value for the orientation angle.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
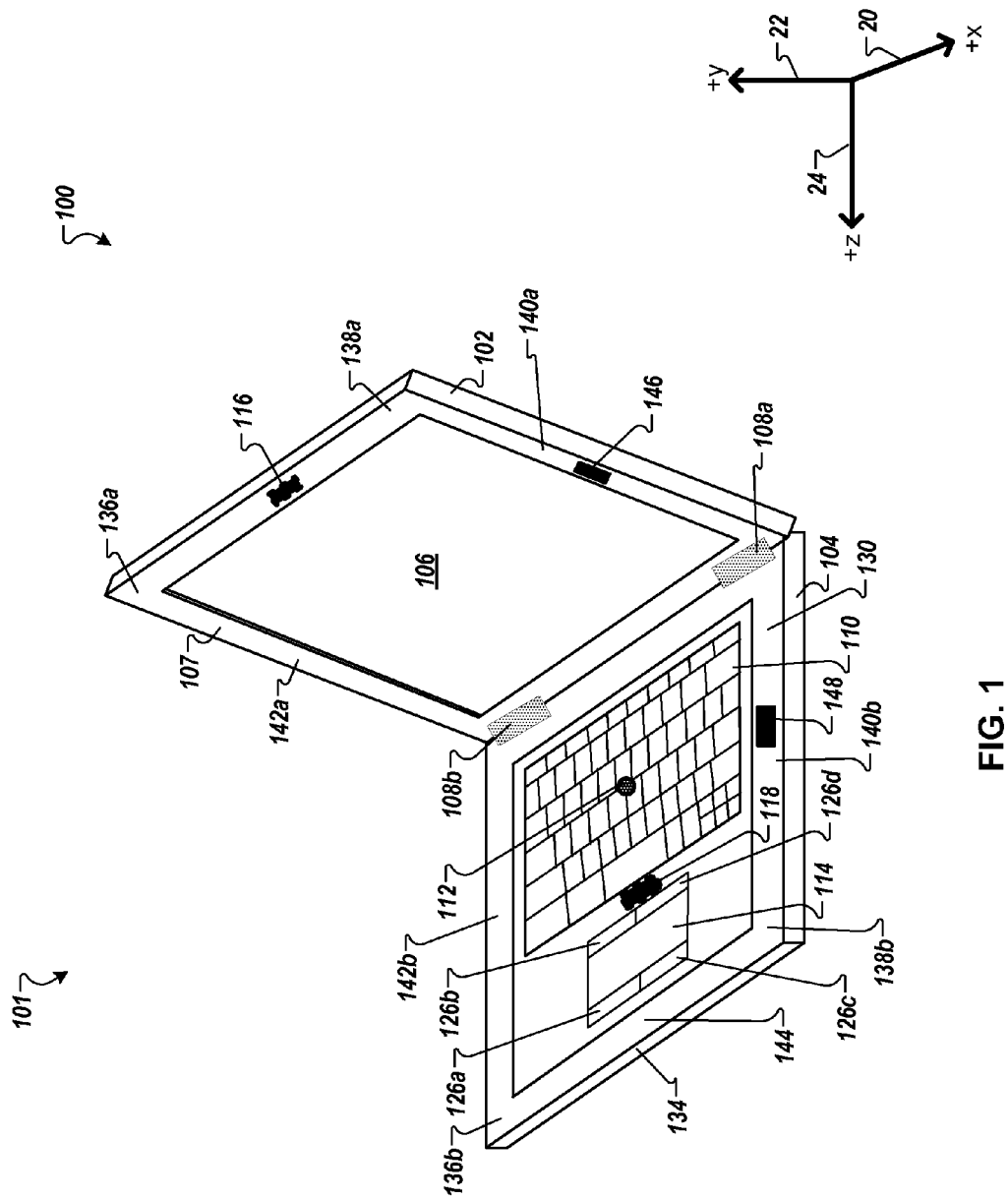
FIG. 1 is a diagram that illustrates a top view of an example computing device in an open position, according to an implementation.

A computing device can include one or more sensors that can be used to determine an operating mode of the computing device. In some implementations, the computing device can include one or more accelerometers. A lid of the computing device can include an accelerometer (e.g., a three-axis accelerometer) and a base of the computing device can include an accelerometer (e.g., a three-axis accelerometer). The computing device can use information and data provided by the accelerometers to determine the motion of the lid relative to the base. In addition, or in the alternative, the computing device can use the accelerometers to determine, once the motion has stopped, the angle of the lid relative to the base.

The computing device can include one or more magnetic sensors (e.g., Hall effect sensors) in the base and one or more magnets in the lid. A magnetic sensor can be used to detect when the computing device is being closed. A magnetic sensor changes state (triggers) and provides an output when a magnet is within a detectable field of the sensor. As a user closes the computing device, the magnetic sensor in the lid of the computing device is brought increasing closer to the magnet in the base of the computing device. Once the magnet in the base is within the detectable field of the magnetic sensor in the lid, the magnetic sensor changes state (triggers) and provides an output to the computing device indicative of the proximity of the lid to the base. Based on the output received from the magnetic sensor, the computing device can determine that the computing device is in a closed position or is approaching a closed position (the computing device is being closed). Based on determining that the computing device is in a closed position or is approaching a closed position, the computing device can transition into a low power state (e.g., a hibernate or a sleep state), the low power state being a power state lower than the power state of the computing device when it is in an opened position.

In some cases, a magnetic sensor can change state (be triggered) when the computing device is not in or approaching a closed position. For example, a magnet or other type of magnetic device if placed within the detectable field of the magnetic sensor will change state (trigger) the magnetic sensor and the magnetic sensor will change state. When triggered, the magnetic sensor can provide an output to the computing device. The computing device can interpret the output from the magnetic sensor as an indication that the computing device is in a closed position or is approaching a closed position, when actually it is not, so that the computing device is placed in the lower power mode, surprising a now unhappy user.

The computing device can use an accelerometer included in the lid of the computing device and an accelerometer included in the base of the computing device to measure an angle between the lid of the computer and the base of the computer when the accelerometers detect movement of the lid with respect to the base. The detected movement and the measured angle can be used to confirm that the output being received from the magnetic sensor is indicative of the closing of the computing device.

FIG. 1 is a diagram that illustrates a top view 101 of an example computing device 100 in an open position, according to an implementation. In this implementation, the computing device 100 includes a lid portion 102 and a base portion 104. The base portion 104 includes an input area 130. The input area 130 can be considered part of a housing of the base portion 104 of the computing device 100. The lid portion 102 includes a display area 106. A bezel 107 surrounds the display area 106. The bezel 107 supports the display area 106 and houses electrical and optical components that allow the display area 106 to function. The display area 106 can include a touch-sensitive display device (e.g., a touchscreen) that is part of (or mounted on) the lid portion 102 of the computing device 100.

The input area 130 includes multiple input devices, such as a keyboard 110, a trackpad 114, a pointer button 112, and mouse buttons 126a-d. A user can interact with one or more of the multiple input devices when providing input to and/or otherwise controlling the operation of an application running on the computing device 100. In addition, or in the alternative, a user can interact with the computing device 100 by making direct contact with (e.g., touching with one or more fingers) the touch-sensitive surface of the lid portion 102 when providing input to and/or otherwise controlling the operation of an application running on the computing device 100.

The computing device 100 includes a magnetic sensor 146 and a magnet 148. In some implementations, the magnetic sensor 146 can be a Hall effect sensor. The example implementation shown in FIG. 1 shows the magnetic sensor 146 on a right edge of the lid portion 102 (e.g., position 140*a*) and the magnet 148 on a right edge of the base portion 104 (e.g., position 140*b*). In some implementations, the magnetic sensor 146 and the magnet 148 can be located in other positions within the computing device 100. In each case, however, the magnet 148 is located below the magnetic sensor 146 when the computing device 100 is in a closed position as described herein and as shown, for example, in FIG. 2.

For example, the magnetic sensor 146 can be placed in a top upper left corner of the lid portion 102 (e.g., position 136*a*) and the magnet 148 can be placed in a bottom front left corner of the base portion 104 (e.g., position 136*b*). For example, the magnetic sensor 146 can be placed in a top upper right corner of the lid portion 102 (e.g., position 138*a*) and the magnet 148 can be placed in a bottom front right corner of the base portion 104 (e.g., position 138*b*). For example, the magnetic sensor 146 can be placed along a right edge of the lid portion 102 (e.g., position 140*a*) and the magnet 148 can be placed along a right edge of the base portion 104 (e.g., position 140*b*). For example, the magnetic sensor 146 can be placed along a left edge of the lid portion 102 (e.g., position 142*a*) and the magnet 148 can be placed along a left edge of the base portion 104 (e.g., position 142*b*). In these examples, and in general, the magnetic sensor 146 may be placed in positions within the bezel 107 of the computing device 100. In these examples, the magnet 148 may be placed in positions outside of the input area 130 of the computing device 100. In some implementations, the magnet 148 can be placed in a position close to or within the input area 130.

The computing device 100 includes a lid accelerometer 116 and a base accelerometer 118. In general, accelerometers (e.g., the lid accelerometer 116 and the base accelerometer 118) can detect movement (motion) of the computing device 100 by measuring acceleration (the rate of change of velocity with respect to time). In some implementations, the detected acceleration can be integrated over time to determine a velocity and/or motion of the computing device 100. Types of accelerometers include, but are not limited to, capacitive accelerometers, piezoelectric accelerometers, piezoresistive accelerometers, magnetoresistive accelerometers, heat transfer accelerometers, and Micro-Electro Mechanical System (MEMS) based accelerometers.

A capacitive accelerometer can sense a change in electrical capacitance with respect to acceleration. A piezoelectric accelerometer can sense electrical potential generated by, for example, a crystal because of an applied stress (e.g., acceleration). A piezoresistive accelerometer can measure a resistance of a material when mechanical stress (acceleration) is applied. A magnetoresistive accelerometer can measure resistance variations resulting from a change in a magnetic field that surrounds the accelerometer. A heat transfer accelerometer can measure internal changes in heat transfer within the accelerometer due to acceleration.

In some implementations, the base accelerometer 118 and the lid accelerometer 116 can be located in positions within the computing device 100 different from the positions shown in FIG. 1. For example, the base accelerometer 118 can be centered along the front edge 134 of the base portion 104 of the computing device 100 (e.g., position 144). For example, the lid accelerometer 116 can be placed in a top upper left corner of the lid portion 102 (e.g., position 136*a*) and the base accelerometer 118 can be placed in a bottom front left corner of the base portion 104 (e.g., position 136*b*). For example, the lid accelerometer 116 can be placed in a top upper right corner of the lid portion 102 (e.g., position 138*a*) and the base accelerometer 118 can be placed in a bottom front right corner of the base portion 104 (e.g., position 138*b*). For example, the lid accelerometer 116 can be placed along a right edge of the lid portion 102 (e.g., position 140*a*) and the base accelerometer 118 can be placed along a right edge of the base portion 104 (e.g., position 140*a*). For example, the lid accelerometer 116 can be placed along a left edge of the lid portion 102 (e.g., position 142*a*) and the base accelerometer 118 can be placed along a left edge of the base portion 104 (e.g., position 142*a*). In these examples, and in general, the lid accelerometer 116 may be placed in positions within the bezel 107 of the computing device 100. In these examples, the base accelerometer 118 may be placed in positions outside of the input area 130 of the computing device 100. In some implementations, the base accelerometer 118 can be placed in a position close to or within the input area 130.

The lid accelerometer 116 and the base accelerometer 118 can be configured to detect movement of the computing device 100. The detected movement can be an amount of motion (e.g., how far the computing device 100 is moved). The detected movement can be a type of motion imparted to the computing device 100 (e.g., twisting or rotating, moving side-to-side or back and forth). The detected motion can be movement of one portion of the computing device 100 relative to the other portion. For example, the lid portion 102 of the computing device 100 can be moved relative to the base portion 104 of the computing device 100. The detected movement of the computing device 100 can indicate a particular condition and/or usage of the computing device 100 at the time the movement is detected.

The lid accelerometer 116 and the base accelerometer 118 can be configured to detect an orientation of the lid portion 102 of the computing device 100 to the base portion 104 of the computing device 100. The lid accelerometer 116 and the base accelerometer 118 can be configured such that an angle between the lid portion 102 of the computing device 100 and the base portion 104 of the computing device 100 can be determined.

The computing device 100 as a whole can move in many directions. In addition, the lid portion 102 of the computing device 100 can move relative to the base portion 104, and the base portion 104 of the computing device 100 can move relative to the lid portion 102. Hinges 108*a-b* attach the lid portion 102 to the base portion 104 and allow movement of the lid portion 102 and the base portion 104 relative to one another. Though shown as two hinges 108*a-b*, more than two hinges or a single hinge can be used to attach the lid portion 102 to the base portion 104. Reference to a hinge 108 in this document refers to the example hinges 108*a-b*. In all cases, the lid accelerometer 116 and the base accelerometer 118 can detect the movement of the computing device 100 as a whole as well as the movement of the lid portion 102 relative to the base portion 104 and the base portion 104 relative to the lid portion 102.

Accelerometers can measure acceleration in one, two, or three axes. For example, single-axis accelerometers can detect inputs along a single axis or plane (in a single dimension) (e.g., an x-axis 20). Two-axis accelerometers can detect inputs along a two axes or planes (in two dimensions)

(e.g., an x-axis 20 and a y-axis 22). Three-axis accelerometers (tri-axis accelerometers) can detect inputs in all three axes or planes (in three dimensions) (e.g., an x-axis 20, a y-axis 22, and a z-axis 24). Data provided by a three-axis accelerometer can include data representative of the direction of gravity relative to the accelerometer. The data can be provided when the accelerometer is moving and when the accelerometer is not moving.

Figure 2:
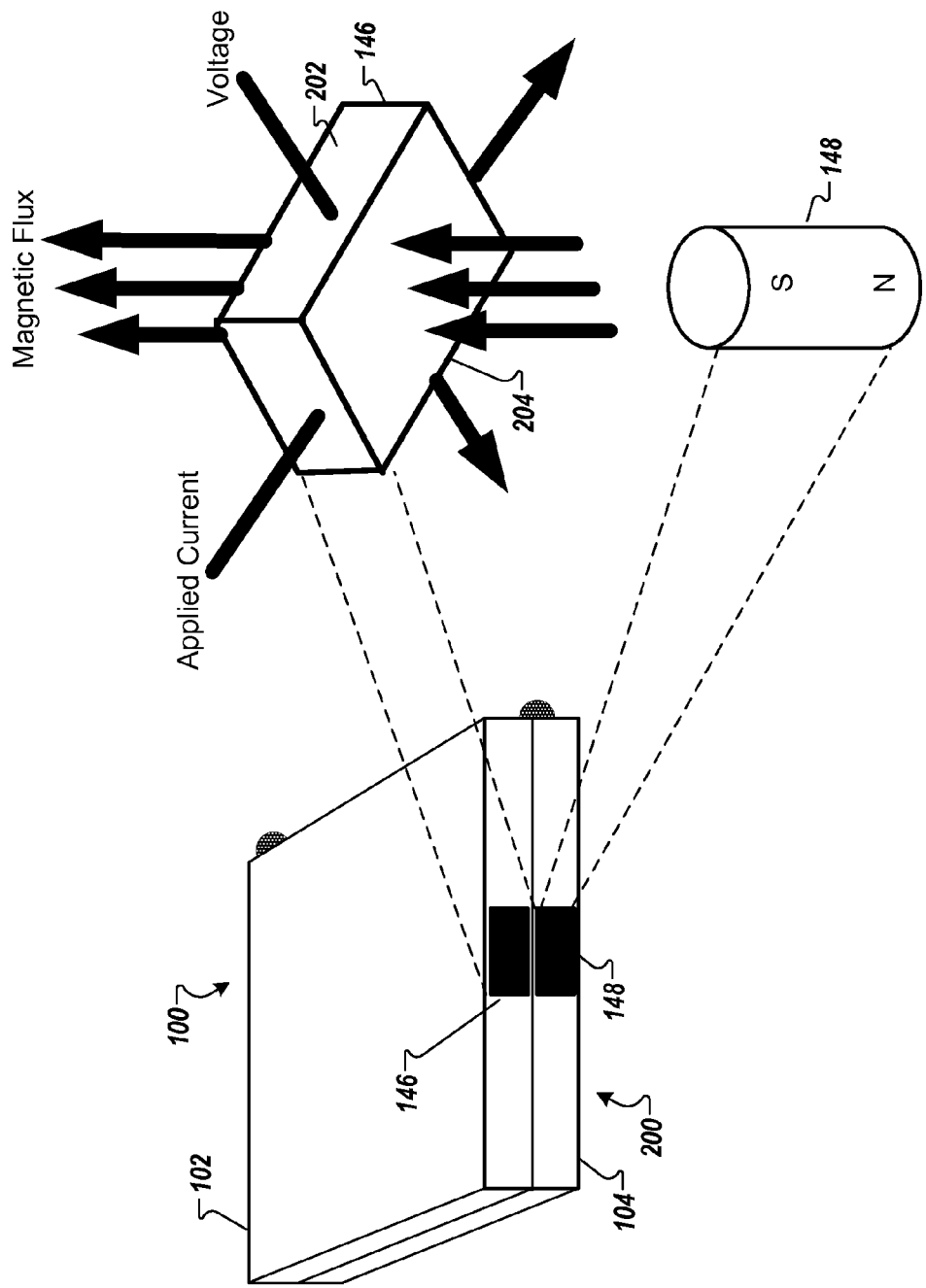
FIG. 2 is a diagram that illustrates a side-view of an example computing device in a closed position.

FIG. 2 is a diagram that illustrates a side-view 200 of the example computing device 100 (as shown in FIG. 1) in a closed position. FIG. 2 also shows an expanded view of the magnetic sensor 146 and the magnet 148. For example, magnetic sensor can be a conductive material (e.g., silicon, gallium arsenide). A voltage can be measured across two faces (e.g., a face 202 and a face 204) of the magnetic sensor 146. A value of the measured voltage is indicative of the distance between the magnetic sensor 146 and the magnet 148. As the magnetic sensor 146 is placed closer to and further within a magnetic field (e.g., a magnetic field provided by the magnet 148), the larger the magnetic flux and the greater the measured voltage.

The magnetic sensor 146 can be used, for example, as a proximity sensor to detect the position (or proximity) of the base portion 104 of the computing device 100 to the lid portion 102 of the computing device 100 when the magnetic sensor 146 is placed in the lid portion 102 and the magnet 148 is placed in the base portion 104. As the lid portion 102 approaches the base portion 104 the magnetic sensor 146 is placed closer to the magnet 148. The magnetic sensor 146 can detect when the computing device 100 is in a closed position (the lid portion 102 is in contact with the base portion 104) because the magnetic sensor 146, being placed close to the magnet 148, will be placed in the magnetic field of the magnet 148, creating a measurable voltage across the two faces of the magnetic sensor 146. In some implementations, the magnetic sensor 146 can be placed in the base portion 104 and the magnet 148 can be placed in the lid portion 102.

The magnet 148 shown in FIG. 2 is cylindrical in shape. In some implementations, the magnet 148 can be shaped as a square, a rectangle, or other shape that can allow the magnet 148 to be placed in the computing device 100.

Figure 3:
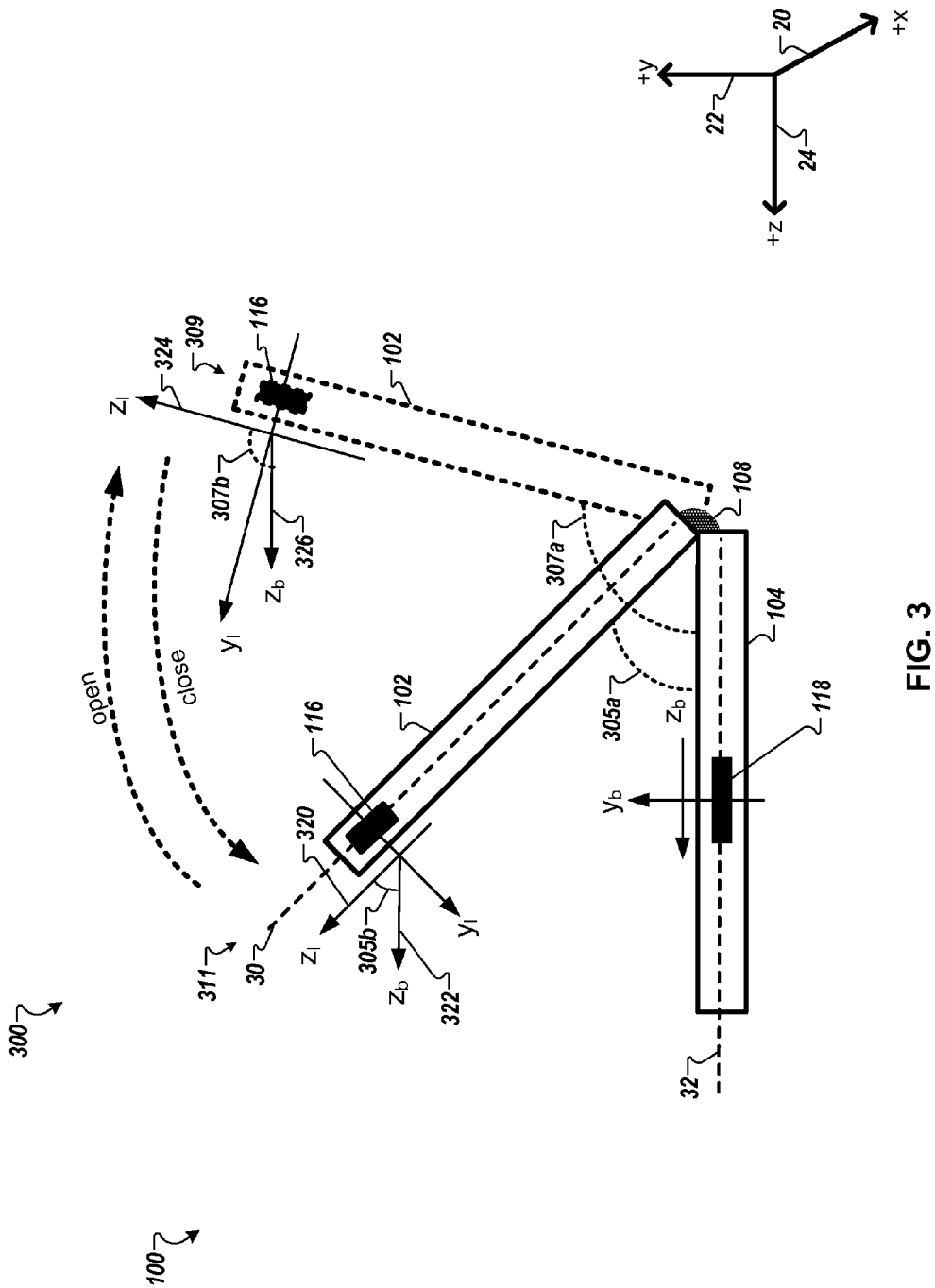
FIG. 3 is a diagram that illustrates axes ($z_l$, $y_l$) of a lid accelerometer and axes ($z_b$, $y_b$) of a base accelerometer in a cross-sectional side-view of an example computing device.

FIG. 3 is a diagram that illustrates axes ($z_l$, $y_l$) of the lid accelerometer 116 and axes ($z_b$, $y_b$) of the base accelerometer 118 of the example computing device 100. The diagram shows a cross-sectional side-view 300 of the computing device 100.

In the example shown in FIG. 3, a y-axis ($y_l$) of the lid accelerometer 116 is perpendicular to a plane 30 of the lid portion 102. A z-axis ($z_l$) of the lid accelerometer 116 is parallel to the plane 30 of the lid portion 102. A y-axis ($y_b$) of the base accelerometer 118 is perpendicular to a plane 32 of the base portion 104. A z-axis ($z_b$) of the base accelerometer 118 is parallel to the plane 32 of the base portion 104. An x-axis of the base accelerometer 118 is parallel to a hinge axis. An x-axis of the lid accelerometer 116 is parallel to the hinge axis. In the example shown in FIG. 3, the base portion 104 of the computing device 100 can be in a stationary horizontal position and placed on a flat surface (e.g., the base portion is placed on a desktop or table). In a first position 309, the lid portion 102 is at an angle 307a relative to the base portion 104. The lid accelerometer 116 can provide information related to the acceleration of the movement of the lid portion 102 towards the base portion 104 and, in this example, to the placement of the lid portion 102 in a second position 311.

In the second position 311, the lid portion 102 is at an angle 305a relative to the base portion 104. In addition, or in the alternative, once placed into the first position 309 and/or the second position 311, the lid portion 102 can remain stationary with respect to the base portion 104. By comparing accelerometer readings for accelerometer vectors on an x, y, and z axis, an orientation of the lid portion 102 with respect to the base portion 104 can be determined based, at least in part, on the orientation of the lid accelerometer 116 and the orientation of the base accelerometer 118 with respect to gravity and to one another where gravity provides the inertial force for the lid accelerometer 116 and the base accelerometer 118.

In the example of FIG. 3, the computing device 100, having determined the placement (position and orientation) of the lid accelerometer 116 and the base accelerometer 118, can determine angle 307b and angle 305b. The angle 307b and the angle 305b are the relative angles between the z-axis ($z_l$) of the lid accelerometer 116 and the z-axis ($z_b$) of the base accelerometer 118. Based on determining the angle 307b and the angle 305b, the computing device 100 can determine the associated angle 307a and the associated angle 307b, respectively, as the angles between the lid portion 102 and the base portion 104 of the computing device 100. The angle 305a and the angle 307a can each be referred to as a lid angle or an orientation angle of the lid portion 102 relative to the base portion 104.

The value of a lid angle can be represented as an angle between two accelerometer vectors. For example, referring to FIG. 3, the angle 305a can be represented as the angle 305b between an accelerometer vector 320 that is parallel to/along the z-axis ($z_l$) of the lid accelerometer 116 (an example accelerometer vector of the lid accelerometer) and an accelerometer vector 322 that is parallel to/along the z-axis ($z_b$) of the base accelerometer 118 (an example accelerometer vector of the base accelerometer). For example, the angle 307a can be represented as the angle 307b between an accelerometer vector 324 that is parallel to/along the z-axis ($z_l$) of the lid accelerometer 116 (an example accelerometer vector of the lid accelerometer) and an accelerometer vector 326 that is parallel to/along the z-axis ($z_b$) of the base accelerometer 118 (an example accelerometer vector of the base accelerometer).

Based on determining the relative angle between the z-axis ($z_l$) of the lid accelerometer 116 and the z-axis ($z_b$) of the base accelerometer 118, the computing device 100 can determine if a user has closed the computing device 100. For example, the lid portion 102 can be rotated about the hinge 108 (about a hinge-axis or an x-axis 20), such that the orientation of the $y_l$ axis changes relative to the $y_b$ axis.

For example, the lid accelerometer 116 detects acceleration along the y-axis ($y_l$) of the lid accelerometer 116 (because the lid accelerometer 116 is always moving in a direction that is tangent to the arc on which the accelerometer moves) and determines that the relative angle between the z-axis ($x_l$) of the lid accelerometer 116 and the z-axis ($zx_b$) of the base accelerometer 118 is decreasing.

Similarly, based on determining the relative angle between the z-axis ($z_l$) of the lid accelerometer 116 and the z-axis ($z_b$) of the base accelerometer 118, the computing device 100 can determine that a computing device 100 is opened (in an open position). For example, the lid accelerometer 116 detects acceleration along the y-axis ($y_l$) of the lid accelerometer 116 and determines that the relative angle between the z-axis ($z_l$) of the lid accelerometer 116 and the z-axis ($z_b$) of the base accelerometer 118 is increasing. For example, the lid portion 102 can be rotated about the $y_l$ axis relative to the $z_l$ axis, where the $z_l$ axis is parallel to the $z_b$ axis.

Referring to FIG. 2, the magnetic sensor 146 can be used in a digital mode of operation (e.g., as a digital switch). In this mode of operation, an output of the magnetic sensor 146 will transition based on a value of a voltage measured across the two faces 202, 204 of the magnetic sensor 146. When a value of the voltage measured across the two faces 202, 204 of the magnetic sensor 146 meets or exceeds a threshold value (e.g., is equal to or greater than a threshold value), the output of the magnetic sensor 146 can transition from a first voltage level (e.g., a first voltage level or value equal to "0", or a first voltage value) to a second voltage level (e.g., a second voltage level equal to "1", or to a second voltage value) indicative of the magnetic sensor 146 being in closed switch mode of operation. When this transition occurs, the magnetic sensor 146 can be referred to as being triggered.

When a value of the voltage measured across the two faces 202, 204 of the magnetic sensor 146 does not meet the threshold value (e.g., a value of the voltage measured across the two faces 202, 204 of the magnetic sensor 146 is below the threshold value or a value of the voltage measured across the two faces 202, 204 of the magnetic sensor 146 is less than the threshold value), the output of the magnetic sensor 146 can transition back to the first voltage level (e.g., can be set equal to "0", or to the first voltage value) indicative of the magnetic sensor 146 being in an open switch mode of operation.

A value of the voltage measured across the two faces 202, 204 of the magnetic sensor 146 can increase as the magnetic sensor 146 approaches and gets closer to the magnet 148. In some implementations, the amount of the voltage increase can be determined based on a sensitivity (or gain) of the magnetic sensor 146. The sensitivity of the magnetic sensor 146 can be set to determine the triggering threshold value for the magnetic sensor 146. For example, the lower the threshold value, the sooner the magnetic sensor 146 will change state (trigger) because the amount of magnetic flux to trigger the magnetic sensor 146 is less and therefore, the magnetic sensor 146 can change state (trigger) at a distance that can be further away from the magnet 148 than if the threshold value were set to a higher value.

In some implementations, the sensitivity of the magnetic sensor 146 can be set so that the magnetic sensor 146 changes state (triggers) at a preferred threshold distance from the magnet 148. In some implementations, in order to avoid any false triggering situations, the sensitivity of the magnetic sensor 146 can be reduced (set to a higher threshold value). Reducing the sensitivity of the magnetic sensor 146 requires more current to flow through the magnetic sensor 146 (and therefore a larger magnetic flux) in order to trigger the magnetic sensor 146. In some cases, the reduction of the sensitivity may require particular shielding of the magnetic sensor 146 and/or a particular critical alignment of the magnetic sensor 146 to the magnet 148. This can increase the cost of the computing device 100 that includes the magnetic sensor 146 and the magnet 148.

In some implementations, the triggering of the magnetic sensor 146 can cause the computing device 100 to transition from one operating state to another operating state. For example, a closed switch mode of operation of the magnetic sensor 146 is indicative of the close proximity of the magnet 148 to the magnetic sensor 146 and therefore, the close proximity of the lid portion 102 of the computing device 100 to the base portion 104 of the computing device 100. The close proximity of the lid portion 102 to the base portion 104 can indicate that the user is closing (or has closed) the computing device 100. In some implementations, the closed switch mode of operation of the magnetic sensor 146 can place the computing device 100 into a lower power mode (e.g., a hibernate mode, a sleep mode). The lower power mode can help conserve power to the computing device 100 while it is closed (and no longer being used by the user). While in a lower power mode, the computing device 100 may deactivate the display area 106 and may deactivate one or more input devices included in an input area 130 making the computing device 100 effectively unusable by the user.

In addition, as a user opens the computing device 100, the magnetic sensor 146 will trigger/transition/change state to an open switch mode of operation as the magnetic sensor 146 is moved further away from the magnet 148. In some implementations, the transitioning of the magnetic sensor 146 from the closed switch mode of operation to the open switch mode of operation can "wake-up" the computing device 100. Waking-up the computing device 100 can transition the computing device 100 from the lower power mode (e.g., a hibernate mode, a sleep mode) into a higher power mode or a full power mode of operation, activating the display area 106 and the one or more input devices included in an input area 130. The user can now interact with the computing device 100.

In some situations, external devices that may include a magnet, if placed in proximity to or close to the computing device 100, can interfere with the functioning of the magnetic sensor 146. For example, the external device may cause the magnetic sensor 146 to enter a closed switch mode of operation even when the magnetic sensor 146 is not within the preferred threshold distance from the magnet 148. If this were to occur, the computing device 100 would be unexpectedly placed into a lower power mode, deactivating the display area 106 and one or more input devices included in an input area 130. This could be an undesirable situation for the user of the computing device 100.

In order to avoid placing the computing device 100 into a mode of operation due to the inadvertent triggering of the magnetic sensor 146, the information and data provided by the lid accelerometer 116 and the base accelerometer 118 can be used along with the magnetic sensor 146 output to determine a current state of the computing device 100.

In some implementations, if the magnetic sensor 146 is triggered from (changes state from) an open switch mode of operation to a closed switch mode of operation and no movement of the lid portion 102 with respect to the base portion 104 is detected by the lid accelerometer 116 and the base accelerometer 118, then the computing device 100 will not be placed into another mode of operation. The computing device 100 can assume that the magnetic sensor 146 was inadvertently triggered.

In some implementations, if the magnetic sensor 146 is triggered and placed into a closed switch mode of operation and the lid accelerometer 116 and the base accelerometer 118 detect movement of the lid portion 102 of the computing device 100 with respect to the base portion 104 of the computing device 100, the computing device 100 next determines, using the information and data from the lid accelerometer 116 and the base accelerometer 118, and as described with reference to FIG. 3, a value of an angle of the lid portion 102 with respect to the base portion 104. The value of the angle can be compared to a closed threshold angle value. Based on the detected movement of the lid portion 102 by the lid accelerometer 116 and the base accelerometer 118 and the determined value of the angle of the lid portion 102 with respect to the base portion 104, the computing device 100 can determine if the computing device 100 should be placed in another mode of operation. For example, if the value of the angle is equal to or greater than the closed threshold angle value, the user is more than likely not closing the computing device 100 and, therefore, the computing device 100 should not be placed in another mode of operation. For example, if the value of the angle is less than the closed threshold angle value, the user is more than likely closing the computing device 100 and, therefore, the computing device 100 should be placed in another mode of operation. The other mode of operation can be a lower power mode of operation such as a hibernate mode or a sleep mode. In some implementations, the closed threshold angle value can be approximately 45 degrees.

Once the magnetic sensor 146 is placed into a closed switch mode of operation and the lid accelerometer 116 and the base accelerometer 118 detect movement of the lid portion 102 of the computing device 100 with respect to the base portion 104 of the computing device 100, the information and data provided by the lid accelerometer 116 and the base accelerometer 118 can be obtained on a more frequent basis. For example, the computing device 100 can obtain (sample) information and data from the lid accelerometer 116 and the base accelerometer 118 on an infrequent basis (e.g., every 0.5 seconds). In another example, the computing device 100 can obtain (sample) information and data from the lid accelerometer 116 and the base accelerometer 118 on a frequent basis (e.g., every 0.1 second). The more frequent sampling (e.g., sampling every 0.1 second) can provide the value of the angle of the lid portion 102 with respect to the base portion 104 on a more frequent basis in order to more quickly determine if the computing device 100 should be placed in another mode of operation. The more frequent sampling can result in no noticeable change in the operation of the computing device 100 when the computing device 100 is placed into the other mode of operation based on determining that the computing device is being closed. The less frequent sampling may result in a noticeable change in the operation of the computing device 100 when the computing device 100 is placed into the other mode of operation based on determining that the computing device is being closed. There may be a noticeable delay in placing the computing device 100 into the other mode of operation based on the delayed determining that the computing device 100 is being closed.

In some implementations, if the magnetic sensor 146 is triggered from a closed switch mode of operation to an open switch mode of operation and no movement of the lid portion 102 with respect to the base portion 104 is detected by the lid accelerometer 116 and the base accelerometer 118, then the computing device 100 will not be placed into another mode of operation. The computing device 100 can assume that the magnetic sensor 146 was inadvertently triggered.

In some implementations, if the magnetic sensor 146 is triggered and placed into an open switch mode of operation from a closed switch mode of operation and the lid accelerometer 116 and the base accelerometer 118 detect movement of the lid portion 102 of the computing device 100 with respect to the base portion 104 of the computing device 100, the computing device 100 next determines, using the information and data from the lid accelerometer 116 and the base accelerometer 118, and as described with reference to FIG. 3, a value of an angle of the lid portion 102 with respect to the base portion 104. The value of the angle can be compared to an open threshold angle value. Based on the detected movement of the lid portion 102 by the lid accelerometer 116 and the base accelerometer 118 and the determined value of the angle of the lid portion 102 with respect to the base portion 104, the computing device 100 can determine if the computing device 100 should be placed in another mode of operation. For example, if the value of the angle is greater than the open threshold angle value, the user is more than likely opening the computing device 100 and, therefore, the computing device 100 should be placed in another mode of operation. The other mode of operation can be a full power mode of operation. In some implementations, the open threshold angle value can be approximately 45 degrees. In some implementations, the open threshold angle value can be the same as (equal to) the closed threshold angle value. In some implementations, the open threshold angle value can be different from the closed threshold angle value.

Figure 4:
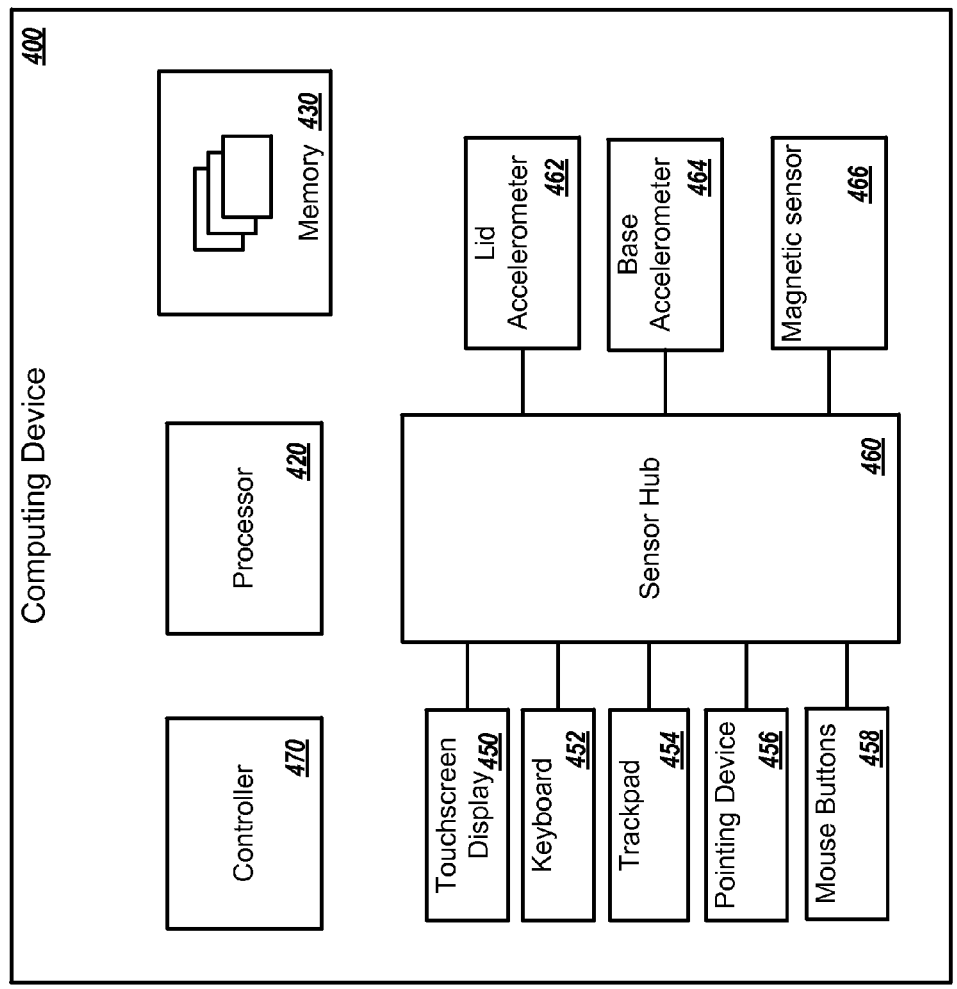
FIG. 4 is a block diagram illustrating example modules included in a computing device.

FIG. 4 is a block diagram illustrating example modules included in a computing device 400. For example, the computing device 400 can be the computing device 100 as shown in FIGS. 1-3. In the example of FIG. 4, the computing device 400 includes a microcontroller 470, a processor 420, memory 430, and a sensor hub 460. Though shown as separate devices in the example in FIG. 4, in some implementations, the processor 420 and the microcontroller 470 may be the same device. For example, the microcontroller 470 and/or the processor 420 can be processors/controllers suitable for the processing of a computer program. The processors/controllers can include, by way of example, both general and special purpose microprocessors, and any one or more processors of any kind of digital computer.

The sensor hub 460 can receive input data from one or more input devices. The input devices can be one or more input devices a user of the computing device 400 may interact with in order to provide input to an application running on the computing device 400. For example, the processor 420 may execute an application that may be stored in the memory 430. The application can display a user interface on a touchscreen display 450 included in the computing device 400. The user can interact with one or more input devices in order to interact with and/or provide input to the application. The input devices can include, but are not limited to, the touchscreen display 450, a keyboard 452, a trackpad 454, a pointing device 456, and mouse buttons 458. In addition, the sensor hub 460 can receive input from a lid accelerometer 462, a base accelerometer 464, and a magnetic sensor 466 (e.g., a Hall effect sensor).

In some implementations, each input device (e.g., input devices 450-458) can be configured to include circuitry and logic to process a physical input received by the respective input device into data that the input device can provide to the sensor hub 460. For example, the touchscreen display 450 can detect pressure at an area (e.g., x-y location) on the touchscreen display 450 as input to an application running on the computing device 400. In another example, the keyboard 452 can detect a user pressing the "a" key on the keyboard and can provide the input of the letter "a" (e.g., a binary representation of the letter "a") to the sensor hub 460. In some implementations, the sensor hub 460 can be configured to include the circuitry and logic to process a physical input received by each of the input devices (e.g., input devices 450-458).

The sensor hub 460 can be configured to include circuitry and logic to process information and data received from the lid accelerometer 462, the base accelerometer 464, and the magnetic sensor 466 as described herein. The lid accelerometer 462 and the base accelerometer 464 can provide acceleration data along an axis of the accelerometer. In addition, the lid accelerometer 462 and the base accelerometer 464 can provide orientation information related to one or more axes of each accelerometer. The magnetic sensor 466 can provide information and data about the proximity of a lid of the computing device 400 to the base of the computing device 400. The computing device 400 can use the information and data to determine if a user is closing or opening the computing device.

In some implementations, a microcontroller 470 can analyze the inputs to sensor hub 460. The microcontroller 470 can analyze the inputs received from the lid accelerometer 462 and the base accelerometer 464. The microcontroller 470 can determine, based on the received inputs from the lid accelerometer 462 and the base accelerometer 464, that the computing device 400 is in motion (is moving) (e.g., the computing device 400 is being closed, the computing device 400 is being opened, the computing device 400 as a whole is moving).

The memory 430 can include/store data and information related to the computing device 400 that may be predetermined (e.g., determined during manufacturing, determined during a calibration or setup procedure) and then used by the computing device 400 when determining if the magnetic sensor has been inadvertently triggered. For example, the memory 430 can include/store threshold values including magnetic sensor trigger threshold values, magnetic sensor sensitivity settings and values, threshold angle values, and other predetermined values and settings used to verify magnetic sensor triggers.

The microcontroller 470 can determine, based on the received inputs from the lid accelerometer 462 and the base accelerometer 464 and data and information stored for the computing device 400 in the memory 430, that a lid portion of a computing device (e.g., the lid portion 102 of computing device 100) is placed at a particular position/angle with respect to a base portion of a computing device (e.g., the lid portion 102 of computing device 100). In some implementations, based on the determined value of the lid angle and the state of the magnetic sensor 146, the computing device 100 can be assumed to be in a particular mode of operation. For example, if the lid angle is equal to zero and the magnetic sensor 146 is placed into a closed switch mode of operation, the computing device 100 can be assumed to be in a low power mode of operation.

Figure 5:
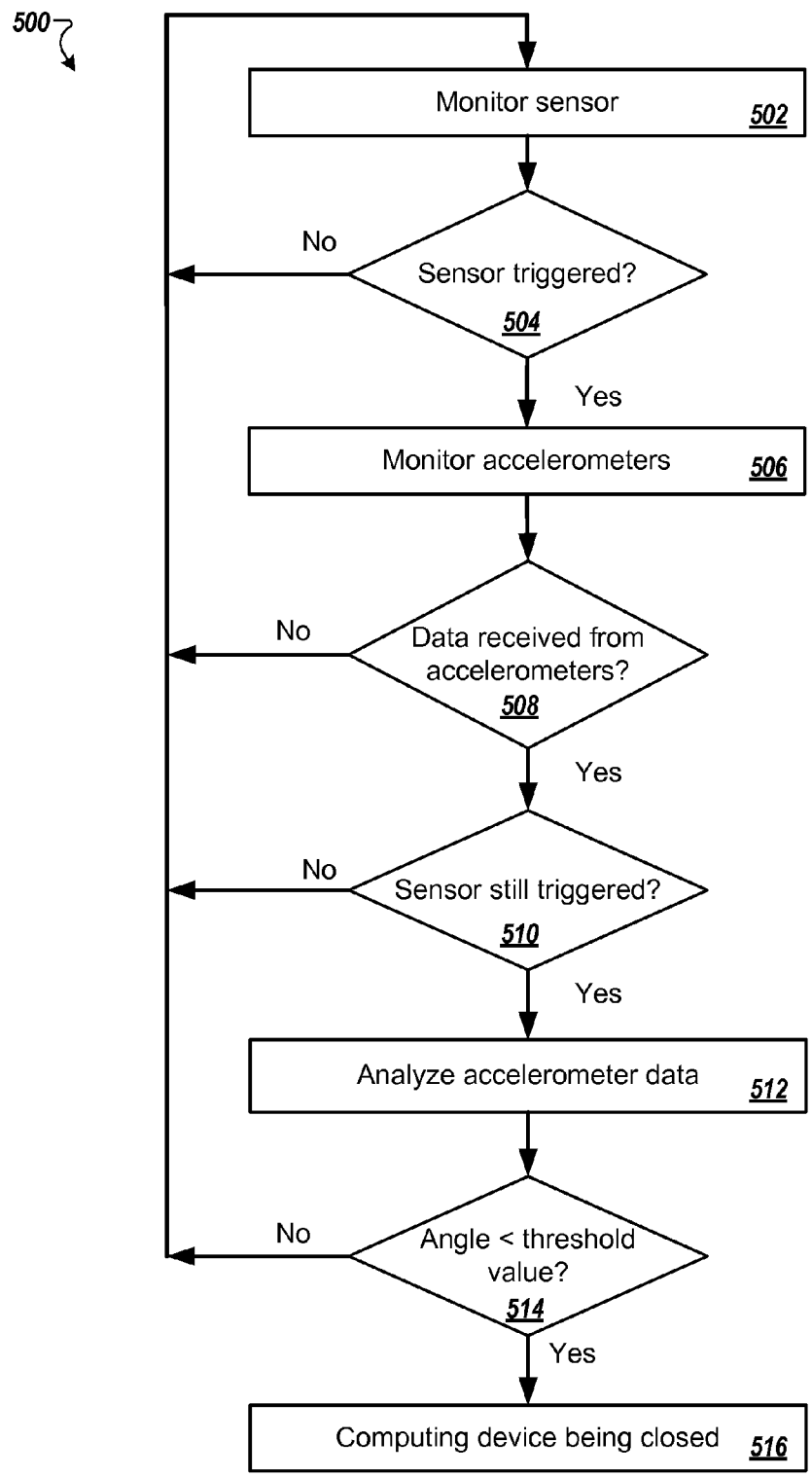
FIG. 5 is a flowchart that illustrates a method for determining if a computing device is being closed.

FIG. 5 is a flowchart that illustrates a method 500 for determining if a computing device is being closed. In some implementations, the method 500 can be implemented by the computing devices (e.g., computing device 100 and computing device 400) as described herein.

Sensors are monitored (block 502). As described with reference to FIG. 1, the computing device 100 monitors the magnetic sensor 146 to determine if it changes mode. For example, the magnetic sensor can change state from an open switch mode of operation to a closed switch mode of operation when triggered. The trigger can be the result of an increase in magnetic flux resulting in an increase in the value of the voltage measured across the two faces (e.g., a face 202 and a face 204 as shown in FIG. 2) of the magnetic sensor 146. In another example, the magnetic sensor can change state from an closed switch mode of operation to an open switch mode of operation when triggered. The trigger can be the result of a decrease in magnetic flux resulting in a decrease in the value of the voltage measured across the two faces (e.g., a face 202 and a face 204 as shown in FIG. 2) of the magnetic sensor 146.

It is determined whether a sensor is triggered (block 504). As described with reference to FIG. 1, for example, the magnetic sensor 146 can be triggered from an open switch mode of operation to a closed switch mode of operation based on the magnetic sensor 146 moving within the magnetic field of the magnet 148. In another example, the magnetic sensor 146 can be triggered from a closed switch mode of operation to an open switch mode of operation based on the magnetic sensor 146 moving outside of the magnetic field of the magnet 148.

If it is determined that the sensor does not change state (is not triggered) (block 504), the method 500 continues to block 502. If it is determined that the sensor does change state (is triggered) (block 504) (an indication of a state change or a triggering of the sensor included in a computing device is received from the sensor), one or more accelerometers are monitored (block 506). The computing device can monitor a first accelerometer and a second accelerometer based on receiving an indication of the state change (triggering) of the sensor. For example, referring to FIG. 1, the computing device 100 can monitor the lid accelerometer 116 and the base accelerometer 118. It is determined if information and data is received from the accelerometers (block 508). If it is determined that no data is received from the accelerometers (block 508), the method 500 continues to block 502 where the method 500 continues to monitor the sensor. In some implementations, if the sensor remains in a same state (remains triggered), the sampling rate of the accelerometer data can be increased. It is then determined whether the indication of the state change (triggering) of the sensor is continuing to be received when the first data and the second data are received.

If it is determined that data is received from the accelerometers (block 508), it is determined if the sensor is still in the same state (still triggered) (block 510). If it is determined that the sensor does not remain in the same state (does not remain triggered) (block 510), the method 500 continues to monitor the sensor (block 502). First data from the first accelerometer and second data from the second accelerometer are received while monitoring the first accelerometer and the second accelerometer.

If it is determined that the sensor remains in the same state (triggered) (block 510), accelerometer data is analyzed (block 512). For example, the computing device 100 can use information and data received from the lid accelerometer 116 and the base accelerometer 118 to determine motion of the lid portion 102 of the computing device 100 with respect to the base portion 104 of the computing device 100. The computing device 100 can use information and data received from the lid accelerometer 116 and the base accelerometer 118 to determine the angle of the lid portion 102 with respect to the base portion 104.

It is determined if the value of the angle of the lid portion 102 with respect to the base portion 104 is less than a threshold value (block 514). If it is determined that the value of the angle of the lid portion 102 with respect to the base portion 104 is not less than (is greater than or equal to) a threshold value (block 514), the method 500 continues to monitor the sensor (block 502).

If it is determined that the value of the angle of the lid portion 102 with respect to the base portion 104 is less than a threshold value (block 514), it is determined that the computing device is being closed (block 516). Based on this determination, the computing device can be transitioned to or be placed in a low power state (e.g., a hibernate or a sleep state), the low power state being a power state lower than the power state of the computing device when it is in an opened position.

Figure 6:
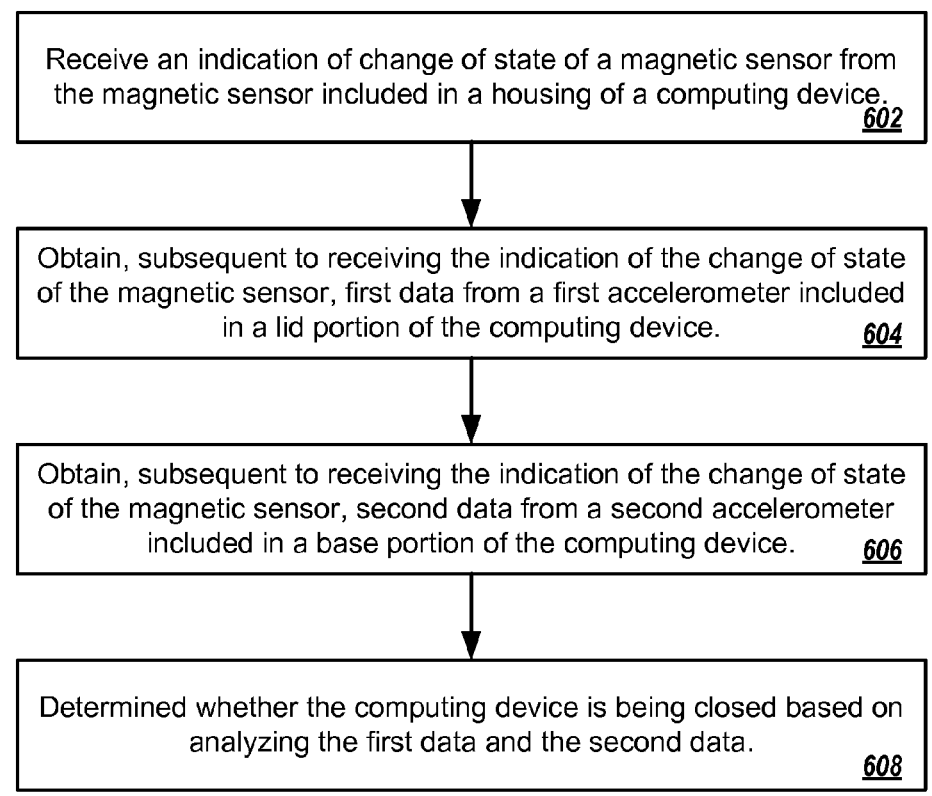
FIG. 6 is a flowchart that illustrates a method for determining if a computing device that includes a sensor and two accelerometers is being closed.

FIG. 6 is a flowchart that illustrates a method 600 for determining if a computing device that includes a magnetic sensor and two accelerometers is being closed. In some implementations, the method 600 can be implemented by the computing devices (e.g., computing device 100 and computing device 400) as described herein.

An indication of a change of state (a triggering) of a magnetic sensor is received from the magnetic sensor included in a housing of a computing device (block 602). Subsequent to receiving the indication of the change of state of the magnetic sensor, first data is obtained from a first accelerometer included in a lid portion of the computing device (block 604). Subsequent to receiving the indication of the change of state of the magnetic sensor, second data is obtained from a second accelerometer included in a base portion of the computing device (block 606). The base portion and the lid portion can be connected by a hinge about which the lid portion is configured to rotate relative to the base portion between an open state and a closed state. It is determined whether the computing device is being closed based on analyzing the first data and the second data (block 608).

Figure 7:
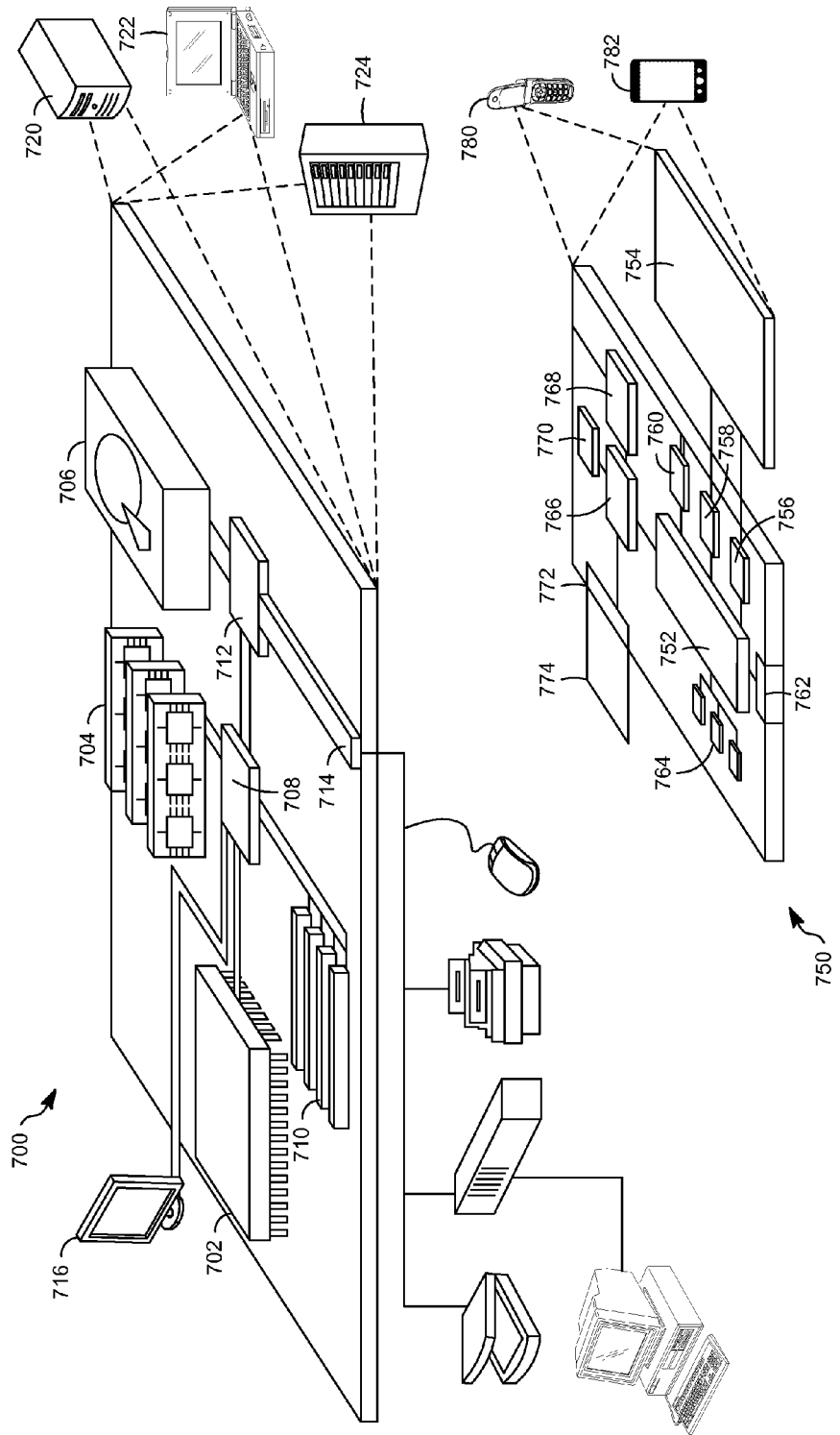
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
receiving, from a magnetic sensor included in a housing of a computing device, an output indicating a triggering of the magnetic sensor, the triggering indicating a possible transitioning of the computing device from an open state to a closed state, the magnetic sensor configured to change state from a first operating mode to a second operating mode based on a voltage measured across two faces of the magnetic sensor, the measured voltage indicative of a distance between the magnetic sensor and a magnet included in the housing of the computing device;
in response to receiving the output indicating the triggering of the magnetic sensor:
obtaining first data from a first accelerometer included in a lid portion of the computing device;
obtaining second data from a second accelerometer included in a base portion of the computing device, the base portion and the lid portion being connected by a hinge about which the lid portion is configured to rotate relative to the base portion between the open state and the closed state;
calculating a value for an orientation angle of the lid portion with respect to the base portion using the first data and the second data; and
confirming that the computing device is being transitioned from the open state to the closed state based on determining that the value for the orientation angle of the lid portion relative to the base portion is less than or equal to a threshold value for the orientation angle; and
based on confirming that the computing device is being transitioned from the open state to the closed state, transitioning the computing device from a first power mode to a second power mode.

2. The method of claim 1, wherein the magnetic sensor is a Hall effect sensor.

3. The method of claim 1, wherein the second power mode is a lower power mode than the first power mode.

4. The method of claim 3, wherein the second power mode is one of a sleep mode or a hibernate mode.

5. The method of claim 1, further comprising:
determining that the lid portion of the computing device is not being rotated relative to the base portion of the computing device from the open state to the closed state based on the calculated value for the orientation angle; and
not confirming that the computing device is being transitioned from the open state to the closed state based on determining that the output received from the magnetic sensor has not changed and based on determining that the lid portion of the computing device is being rotated relative to the base portion of the computing device from the open state to the closed state.

6. The method of claim 1,
wherein the first data is a lid accelerometer vector for the lid accelerometer,
wherein the second data is a base accelerometer vector for the base accelerometer, and
wherein calculating the value for the orientation angle of the lid portion relative to the base portion is based on the lid accelerometer vector and the base accelerometer vector.

7. The method of claim 6, further comprising:
not confirming that the computing device is being transitioned from the open state to the closed state based on determining that the output received from the magnetic sensor has not changed and based on determining that the value of the orientation angle is greater than the threshold value for the orientation angle.

8. A non-transitory, machine-readable medium having instructions stored thereon, the instructions, when executed by a processor, cause a computing device to:
receive, from a magnetic sensor included in a housing of a computing device, an output indicating a triggering of the magnetic sensor, the triggering indicating a possible transitioning of the computing device from an open state to a closed state, the magnetic sensor configured to change state from a first operating mode to a second operating mode based on a voltage measured across two faces of the magnetic sensor, the measured voltage indicative of a distance between the magnetic sensor and a magnet included in the housing of the computing device;
in response to receiving the output indicating the triggering of the magnetic sensor:
obtain first data from a first accelerometer included in a lid portion of the computing device;
obtain second data from a second accelerometer included in a base portion of the computing device, the base portion and the lid portion being connected by a hinge about which the lid portion is configured to rotate relative to the base portion between the open state and the closed state;
calculate a value for an orientation angle of the lid portion with respect to the base portion using the first data and the second data; and
confirm that the computing device is being transitioned from the open state to the closed state based on determining that the value for the orientation angle of the lid portion with respect to the base portion is not less than a threshold value; and
based on confirming that the computing device is being transitioned from the open state to the closed state, transitioning the computing device from a first power mode to a second power mode.

9. The medium of claim 8, wherein the magnetic sensor is a Hall effect sensor.

10. The medium of claim 8, wherein the second power mode is a lower power mode that the first power mode.

11. The medium of claim 10, wherein the second power mode is one of a sleep mode or a hibernate mode.

12. The medium of claim 8, wherein the instructions, when executed by the processor, further cause the computing device to:
determine that the lid portion of the computing device is not being rotated relative to the base portion of the computing device from the open state to the closed state based on the calculated value for the orientation angle; and
not confirm that the computing device is being transitioned from the open state to the closed state based on determining that the output received from the magnetic sensor has not changed and based on determining that the lid portion of the computing device is not being rotated relative to the base portion of the computing device from the open state to the closed state.

13. The medium of claim 8,
wherein the first data is a lid accelerometer vector for the lid accelerometer,
wherein the second data is a base accelerometer vector for the base accelerometer, and wherein calculating the value for the orientation angle of the lid portion relative to the base portion is based on the lid accelerometer vector and the base accelerometer vector.

14. The medium of claim 13, wherein the instructions, when executed by the processor, further cause the computing device to:
not confirm that the computing device is being transitioned from the open state to the closed state based on determining that the output received from the magnetic sensor has not changed and based on determining that the value of the orientation angle is greater than the threshold value for the orientation angle.

15. A computing device comprising:
a lid portion;
a base portion;
a magnet;
a magnetic sensor including two faces, the magnetic sensor configured to change state from a first operating mode to a second operating mode based on a voltage measured across the two faces, the measured voltage indicative of a distance between the magnetic sensor and the magnet;
a lid accelerometer configured to measure acceleration and orientation associated with the lid portion of the computing device;
a base accelerometer configured to measure acceleration and orientation associated with the base portion of the computing device; and
a controller configured to:
determine that the magnetic sensor has triggered, the triggering indicating a possible transitioning of the computing device from an open state to a closed state; and subsequent to determining that the magnetic sensor has triggered:
calculate a value for an orientation angle of the lid portion with respect to the base portion using data received from the lid accelerometer and the base accelerometer;
confirm that the computing device is transitioning from the open state to the closed state based on determining that the value of the orientation angle is equal to or less than a threshold value for the orientation angle; and
transition the computing device from a first power state to a second power state based on confirming the transitioning of the computing device from the open state to the closed state.

16. The computing device of claim 15, wherein the magnetic sensor is a Hall effect sensor.

17. The computing device of claim 15,
wherein the first power state is a full power state; and
wherein the second power state is one of a sleep mode or a hibernate mode.

18. The computing device of claim 15, wherein the controller is further configured to, subsequent to determining that the magnetic sensor has triggered:
not confirm that the computing device is transitioning from the open state to the closed state based on determining that the value of the orientation angle is greater than the threshold value for the orientation angle; and
not transition the computing device from a first power state to a second power state based on not confirming the transitioning of the computing device from the open state to the closed state.

* * * * *